United States Patent
Zhang et al.

(10) Patent No.: US 10,489,569 B2
(45) Date of Patent: Nov. 26, 2019

(54) VOICE SERVICE REGISTRATION METHOD AND DIGITAL TERMINAL

(71) Applicant: Huawei Technologies Co., Ltd., Shenzhen (CN)

(72) Inventors: Xigang Zhang, Wuhan (CN); Zhiyong Xia, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 230 days.

(21) Appl. No.: 15/550,278

(22) PCT Filed: Feb. 10, 2015

(86) PCT No.: PCT/CN2015/072629
§ 371 (c)(1),
(2) Date: Aug. 10, 2017

(87) PCT Pub. No.: WO2016/127304
PCT Pub. Date: Aug. 18, 2016

(65) Prior Publication Data
US 2018/0032711 A1    Feb. 1, 2018

(51) Int. Cl.
*G06F 21/32* (2013.01)
*H04M 3/42* (2006.01)
(Continued)

(52) U.S. Cl.
CPC ........ *G06F 21/32* (2013.01); *H04M 3/42272* (2013.01); *H04W 8/12* (2013.01); *H04W 12/06* (2013.01); *H04W 60/00* (2013.01)

(58) Field of Classification Search
CPC . H04L 29/06; H04L 65/1069; H04L 65/1073; H04M 3/42272; H04W 8/12; H04W 12/06; H04W 60/00
See application file for complete search history.

(56) References Cited

U.S. PATENT DOCUMENTS 8,985,442 B1 * 3/2015 Zhou ................. G06Q 20/30
                                                    235/375
2002/0150083 A1  10/2002 Fangman et al.
(Continued)

FOREIGN PATENT DOCUMENTS

CN    1852344 A    10/2006
CN    1968504 A    5/2007
(Continued)

OTHER PUBLICATIONS

Foreign Communication From A Counterpart Application, European Application No. 15881466.5, Extended European Search Report dated Feb. 13, 2018, 8 pages.
(Continued)

*Primary Examiner* — Chandrahas B Patel
(74) *Attorney, Agent, or Firm* — Conley Rose, P.C.

(57) ABSTRACT

A voice service registration method and a digital terminal, relate to the communications field and applied to a voice service registration process, where the method and the terminal are used to resolve a problem that a voice service cannot be recovered in time after an upper-layer network of a digital terminal is recovered from a fault. A specific solution includes that after a digital terminal re-registers a voice service for the $n^{th}$ time, detecting, by the digital terminal, that a user performs a first operation on a voice terminal connected to the digital terminal, where n is an integer greater than or equal to 1, and triggering, by the digital terminal, a voice service registration process when detecting that registration of the voice service fails.

18 Claims, 3 Drawing Sheets

(51) Int. Cl.
*H04W 8/12* (2009.01)
*H04W 12/06* (2009.01)
*H04W 60/00* (2009.01)

(56) References Cited

U.S. PATENT DOCUMENTS

| | | | |
|---|---|---|---|
| 2004/0218736 | A1 | 11/2004 | Fang et al. |
| 2007/0298794 | A1 | 12/2007 | Cho |
| 2011/0199974 | A1 | 8/2011 | Ye |
| 2012/0014324 | A1 | 1/2012 | Dwyer et al. |
| 2016/0156678 | A1 | 6/2016 | Li et al. |

FOREIGN PATENT DOCUMENTS

| | | | |
|---|---|---|---|
| CN | 101159620 | A | 4/2008 |
| CN | 101753667 | A | 6/2010 |
| CN | 101964806 | A | 2/2011 |
| CN | 102118519 | A | 7/2011 |
| CN | 102255747 | A | 11/2011 |
| CN | 102461276 | A | 5/2012 |
| CN | 102577483 | A | 7/2012 |
| CN | 102624563 | A | 8/2012 |
| CN | 103441862 | A | 12/2013 |
| CN | 104185220 | A | 12/2014 |
| EP | 2197169 | A1 | 6/2010 |
| EP | 2346293 | A1 | 7/2011 |
| WO | 2010141785 | A1 | 12/2010 |
| WO | 2013134318 | A1 | 9/2013 |

OTHER PUBLICATIONS

Machine Translation and Abstract of Chinese Publication No. CN1852344, dated Oct. 25, 2006, 11 pages.
Machine Translation and Abstract of Chinese Publication No. CN1968504, dated May 23, 2007, 17 pages.
Machine Translation and Abstract of Chinese Publication No. CN101159620, dated Apr. 9, 2008, 9 pages.
Machine Translation and Abstract of Chinese Publication No. CN102118519, dated Jul. 6, 2011, 16 pages.
Machine Translation and Abstract of Chinese Publication No. CN102255747, dated Nov. 23, 2011, 29 pages.
Machine Translation and Abstract of Chinese Publication No. CN102577483, dated Jul. 11, 2012, 15 pages.
Machine Translation and Abstract of Chinese Publication No. CN104185220, dated Dec. 3, 2014, 23 pages.
Foreign Communication From A Counterpart Application, PCT Application No. PCT/CN2015/072629, English Translation of International Search Report dated Nov. 6, 2015, 2 pages.
Foreign Communication From A Counterpart Application, PCT Application No. PCT/CN2015/072629, English Translation of Written Opinion dated Nov. 6, 2015, 4 pages.
Machine Translation and Abstract of Chinese Publication No. CN101964806, dated Feb. 2, 2011, 11 pages.
Machine Translation and Abstract of Chinese Publication No. CN102624563, dated Aug. 1, 2012, 6 pages.
Foreign Communication From A Counterpart Application, Chinese Application No. 201580001966.X, Chinese Office Action dated Aug. 17, 2018, 8 pages.

* cited by examiner

VOICE SERVICE REGISTRATION METHOD AND DIGITAL TERMINAL

CROSS-REFERENCE TO RELATED APPLICATION

This application is a U.S. National Stage of International Patent Application No. PCT/CN2015/072629 filed on Feb. 10, 2015, which is hereby incorporated by reference in its entirety.

TECHNICAL FIELD

The present disclosure relates to the communications field, and in particular, to a voice service registration method and a digital terminal.

BACKGROUND

Currently, a digital terminal (such as an integrated access device (IAD)) can not only provide an Internet access service for a user, but also provide a voice service for the user. However, in a process in which the digital terminal provides the voice service for the user, when a fault occurs in an upper-layer network of the digital terminal, registration of the voice service of the digital terminal fails. After the registration of the voice service of the digital terminal fails, the digital terminal performs a first registration retry according to a Session Initiation Protocol (SIP) standard to detect whether the upper-layer network of the digital terminal has been recovered from the fault. If the digital terminal determines that the first registration retry fails, the digital terminal waits for T seconds and performs a second registration retry. If the digital terminal determines that the second registration retry fails, the digital terminal waits for 2T seconds and performs a third registration retry, and so on. If the digital terminal determines that the $n^{th}$ registration retry fails, the digital terminal waits for n*T seconds and performs an $(n+1)^{th}$ registration retry, until a maximum time interval is reached. Subsequently, registration retries are performed according to the maximum time interval until the registration succeeds, and after the registration of the voice service of the digital terminal succeeds, the user can normally use the voice service.

However, in a period when the digital terminal waits to perform a next registration retry, if the upper-layer network of the digital terminal is recovered from the fault, because a detection time is not reached yet, the digital terminal does not initiate a voice service registration request, and consequently, the voice service cannot be recovered in time.

SUMMARY

The present disclosure provides a voice service registration method and a digital terminal to resolve a problem that a voice service cannot be recovered in time after an upper-layer network of a digital terminal is recovered from a fault.

To achieve the foregoing objective, the present disclosure uses the following technical solutions.

According to a first aspect of the present disclosure, a voice service registration method is provided, including detecting, by the digital terminal, that a user performs a first operation on a voice terminal connected to the digital terminal after a digital terminal re-registers a voice service for the $n^{th}$ time, where n is an integer greater than or equal to 1, and triggering, by the digital terminal, a voice service registration process when detecting that registration of the voice service fails.

With reference to the first aspect of the present disclosure, in a first possible implementation manner, when a fault of an upper-layer network of the digital terminal is a broadband remote access server (BRAS) fault, after triggering, by the digital terminal, a voice service registration process when detecting that registration of the voice service fails, the method further includes determining, by the digital terminal, that a registration response packet sent by a voice server is not received, and triggering, by the digital terminal, a Dynamic Host Configuration Protocol (DHCP) request process.

With reference to the first aspect of the present disclosure, in a second possible implementation manner, after triggering, by the digital terminal, a voice service registration process when detecting that registration of the voice service fails, the method further includes determining, by the digital terminal, that a registration response packet sent by a voice server is not received, and triggering, by the digital terminal, the voice service registration process after a preset time, where the preset time is less than or equal to (n+1)*T, and T is a shortest time needed by the digital terminal to trigger the voice service registration process.

With reference to the second possible implementation manner of the first aspect of the present disclosure, in a third possible implementation manner, before triggering, by the digital terminal, the voice service registration process after a preset time, the method further includes determining, by the digital terminal, whether the first operation is detected within the preset time, and triggering, by the digital terminal, the voice service registration process after a preset time includes triggering, by the digital terminal, the voice service registration process after the preset time if the digital terminal does not detect the first operation within the preset time.

With reference to the third possible implementation manner of the first aspect of the present disclosure, in a fourth possible implementation manner, the method further includes triggering, by the digital terminal, the voice service registration process if the digital terminal detects the first operation within the preset time.

With reference to any one of the first aspect of the present disclosure, or the first possible implementation manner of the first aspect to the fourth possible implementation manner of the first aspect, in a fifth possible implementation manner, the first operation is any one of an off-hook operation, a key-pressing operation, an operation of starting a call application, or a touch operation.

According to the second aspect of the present disclosure, a digital terminal is provided, where the digital terminal includes a detection unit and a trigger unit, where the detection unit is configured to detect that a user performs a first operation on a voice terminal connected to the digital terminal after the digital terminal re-registers a voice service for the $n^{th}$ time, where n is an integer greater than or equal to 1, and the trigger unit is configured to trigger a voice service registration process when it is detected that registration of the voice service fails.

With reference to the second aspect of the present disclosure, in a first possible implementation manner, when a fault of an upper-layer network of the digital terminal is a BRAS fault, the digital terminal further includes a determining unit, where the determining unit is configured to determine that a registration response packet sent by a voice server is not received after the trigger unit triggers the voice service registration process when it is detected that registration of the voice service fails, and the trigger unit is further configured to trigger a DHCP request process.

With reference to the second aspect of the present disclosure, in a second possible implementation manner, the digital terminal further includes a determining unit, where the determining unit is configured to determine that a registration response packet sent by a voice server is not received after the trigger unit triggers the voice service registration process when it is detected that registration of the voice service fails, and the trigger unit is further configured to trigger the voice service registration process after a preset time, where the preset time is less than or equal to $(n+1)*T$, and T is a shortest time needed by the trigger unit to trigger the voice service registration process.

With reference to the second possible implementation manner of the second aspect of the present disclosure, in a third possible implementation manner, the determining unit is further configured to determine whether the first operation is detected within the preset time before the trigger unit triggers the voice service registration process after the preset time, and the trigger unit is further configured to trigger the voice service registration process after the preset time if the determining unit does not detect the first operation within the preset time.

With reference to the third possible implementation manner of the second aspect of the present disclosure, in a fourth possible implementation manner, the trigger unit is further configured to trigger the voice service registration process if the determining unit detects the first operation within the preset time.

With reference to any one of the second aspect of the present disclosure, or the first possible implementation manner of the second aspect to the fourth possible implementation manner of the second aspect, in a fifth possible implementation manner, the first operation is any one of an off-hook operation, a key-pressing operation, an operation of starting a call application, or a touch operation.

According to a third aspect of the present disclosure, a digital terminal is provided, where the digital terminal includes a processor, where the processor is configured to detect that a user performs a first operation on a voice terminal connected to the digital terminal after the digital terminal re-registers a voice service for the $n^{th}$ time, where n is an integer greater than or equal to 1, and the processor is further configured to trigger a voice service registration process when detecting that registration of the voice service fails.

With reference to the third aspect of the present disclosure, in a first possible implementation manner, when a fault of an upper-layer network of the digital terminal is a BRAS fault, the processor is further configured to determine that a registration response packet sent by a voice server is not received after triggering the voice service registration process when detecting that registration of the voice service fails, and the processor is further configured to trigger a DHCP request process.

With reference to the third aspect of the present disclosure, in a second possible implementation manner, the processor is further configured to determine that a registration response packet sent by a voice server is not received after triggering the voice service registration process when detecting that registration of the voice service fails, and the processor is further configured to trigger the voice service registration process after a preset time, where the preset time is less than or equal to $(n+1)*T$, and T is a shortest time needed by the processor to trigger the voice service registration process.

With reference to the second possible implementation manner of the third aspect of the present disclosure, in a third possible implementation manner, the processor is further configured to determine whether the first operation is detected within the preset time before triggering the voice service registration process after the preset time, and the processor is further configured to trigger the voice service registration process after the preset time if the first operation is not detected within the preset time.

With reference to the third possible implementation manner of the third aspect of the present disclosure, in a fourth possible implementation manner, the processor is further configured to trigger the voice service registration process if the first operation is detected within the preset time.

With reference to any one of the third aspect of the present disclosure, or the first possible implementation manner of the third aspect to the fourth possible implementation manner of the third aspect, in a fifth possible implementation manner, the first operation is any one of an off-hook operation, a key-pressing operation, an operation of starting a call application, or a touch operation.

According to a fourth aspect of the present disclosure, a computer program product is provided, where the computer program product includes a readable storage medium that is used to store computer program code, the computer program code is run on a processor, and the computer program code configured to detect that a user performs a first operation on a voice terminal connected to the computer program product after a voice service is re-registered for the $n^{th}$ time, where n is an integer greater than or equal to 1, and trigger a voice service registration process when detecting that registration of the voice service fails.

With reference to the fourth aspect of the present disclosure, in a first possible implementation manner, when a fault of an upper-layer network of the computer program product is a BRAS fault, the computer program code further configured to determine that a registration response packet sent by a voice server is not received after triggering the voice service registration process when detecting that registration of the voice service fails, and trigger a DHCP request process.

With reference to the fourth aspect of the present disclosure, in a second possible implementation manner, the computer program code further configured to determine that a registration response packet sent by a voice server is not received after triggering the voice service registration process when detecting that registration of the voice service fails, and trigger the voice service registration process after a preset time, where the preset time is less than or equal to $(n+1)*T$, and T is a shortest time needed to trigger the voice service registration process.

With reference to the second possible implementation manner of the fourth aspect of the present disclosure, in a third possible implementation manner, the computer program code further configured to determine whether the first operation is detected within the preset time before triggering the voice service registration process after the preset time, and trigger the voice service registration process after the preset time if the first operation is not detected within the preset time.

With reference to the third possible implementation manner of the fourth aspect of the present disclosure, in a fourth possible implementation manner, the computer program code further configured to trigger the voice service registration process if the first operation is detected within the preset time.

With reference to any one of the fourth aspect of the present disclosure, or the first possible implementation manner of the fourth aspect to the fourth possible implementation manner of the fourth aspect, in a fifth possible implementation manner, the first operation is any one of an off-hook operation, a key-pressing operation, an operation of starting a call application, or a touch operation.

According to the voice service registration method and the digital terminal provided in the embodiments of the present disclosure, after the digital terminal re-registers a voice service for the $n^{th}$ time, the digital terminal detects that a user performs a first operation on a voice terminal connected to the digital terminal, and in this case, if detecting that registration of the voice service fails, the digital terminal directly triggers a voice service registration process. In this way, after an upper-layer network of the digital terminal is recovered from a fault, the digital terminal can directly trigger the voice service registration process according to the first operation of the user, and no longer needs to passively wait until a detection time is reached and then trigger the voice service registration process, ensuring that the voice service can be recovered in time.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

Figure 1:
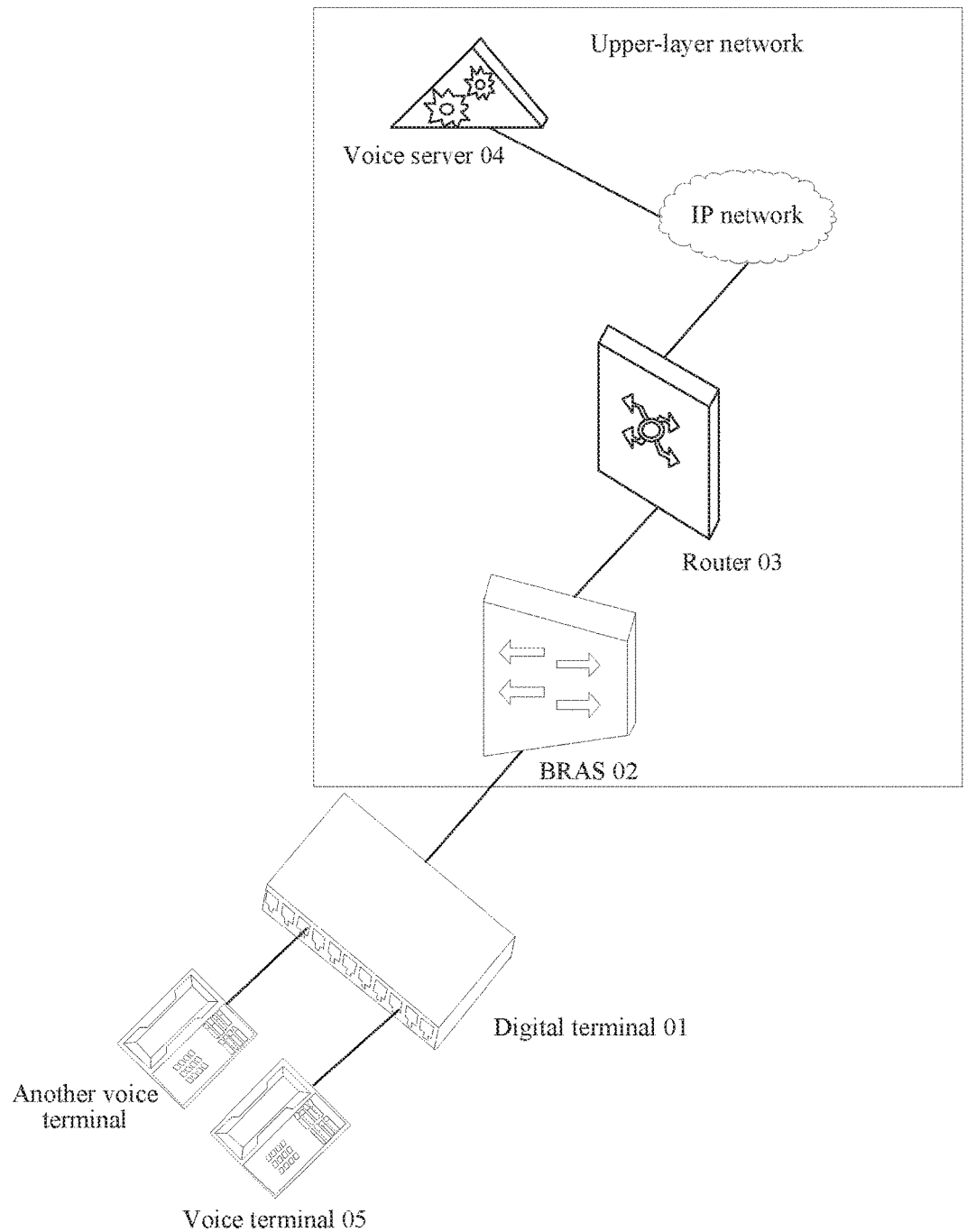
FIG. 1 is a schematic diagram of a system architecture for implementing a voice service registration method according to an embodiment of the present disclosure.

As shown in FIG. 1, FIG. 1 is a schematic diagram of a system architecture to which a voice service registration method according to an embodiment of the present disclosure is applied. The system includes a digital terminal 01, a BRAS 02, a router 03, an Internet Protocol (IP) network, and a voice server 04. The digital terminal 01 may be connected to a voice terminal 05 such as a fixed-line phone, and in this way, the voice terminal 05 may perform voice communication with another voice terminal using the IP network. However, when a fault occurs in an upper-layer network of the digital terminal 01, the user cannot perform voice communication. Once the upper-layer network is recovered from the fault, the digital terminal 01 cannot learn, in time, information that the upper-layer network has been recovered from the fault. In this case, the digital terminal has to wait until a detection time is reached and then trigger a voice service registration process, and consequently, a voice service cannot be recovered in time. By means of the voice service registration method and the digital terminal provided in the embodiments of the present disclosure, a voice service registration process may be triggered in time according to an operation of the user, and it is unnecessary to wait to perform registration until a detection time is reached such that a voice service can be recovered in time.

Figure 2:
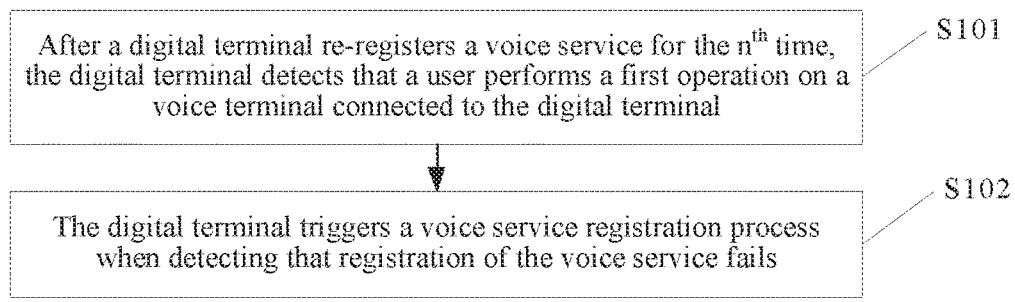
FIG. 2 is a flowchart of a voice service registration method according to an embodiment of the present disclosure.

An embodiment of the present disclosure provides a voice service registration method. As shown in FIG. 2, the method may include the following steps.

Step S101: After a digital terminal re-registers a voice service for the $n^{th}$ time, the digital terminal detects that a user performs a first operation on a voice terminal connected to the digital terminal, where n is an integer greater than or equal to 1.

The first operation includes an off-hook operation, a handsfree-pressing operation, a key-pressing operation, an operation of starting a call application, or a touch operation. When the voice terminal connected to the digital terminal is a fixed-line phone, the first operation may be the off-hook operation or the handsfree-pressing operation. The first operation may be the key-pressing operation when the voice terminal connected to the digital terminal is a handset of a twin handset phone. The first operation may be the operation of starting a call application when the voice terminal connected to the digital terminal is an intelligent terminal (such as a fixed-line phone installed with an operating system). The first operation may be the touch operation when the voice terminal connected to the digital terminal is a fixed terminal (such as a card reader of an access control system, where the card reader has a touchscreen). A specific form of the first operation is not limited in this embodiment of the present disclosure.

Further, in the process of providing, by the digital terminal, the voice service for the user, the digital terminal registers the voice service. When a fault occurs in an upper-layer network of the digital terminal, registration of the voice service of the digital terminal fails. After the registration of the voice service of the digital terminal fails, the digital terminal re-registers the voice service for the first time. After the first re-registration of the voice service fails, the digital terminal re-registers the voice service for the second time, and so on. After the $(n-1)^{th}$ re-registration of the voice service fails, the digital terminal re-registers the voice service for the $n^{th}$ time, until registration succeeds. In step S101 of this embodiment of the present disclosure, after the digital terminal re-registers the voice service for the $n^{th}$ time, the digital terminal detects whether the user performs the first operation on the voice terminal, and after detecting that the user performs the first operation on the voice terminal, performs step S102.

Step S102: The digital terminal triggers a voice service registration process when detecting that registration of the voice service fails.

After the digital terminal detects that the user performs the first operation on the voice terminal connected to the digital terminal, the digital terminal may detect whether registration of the voice service succeeds, and when the registration of the voice service fails, trigger the voice service registration process. If the digital terminal detects that the registration of the voice service succeeds, in this case, a prompt tone used to indicate that the voice service is normal may be played, to prompt the user that the user may dial a number.

For example, if n is 2, and the first operation is an off-hook operation, after the digital terminal re-registers the voice service for the second time, the digital terminal detects that the user performs the off-hook operation on the voice terminal connected to the digital terminal, and the digital terminal detects that registration of the voice service fails (that is, the second re-registration of the voice service fails). In this case, the digital terminal triggers the voice service registration process. The data terminal triggers the voice service registration process includes that the digital terminal sends a registration packet to a voice server using an intermediate network device (as shown in FIG. 1, the digital terminal sends the registration packet to the voice server using a BRAS, a Router, and a device in an IP network), if the upper-layer network is recovered from the fault at this point, the digital terminal can receive, within a specified time (generally, the specified time is less than one second), a registration response packet sent by the voice server using the intermediate network device, that is, registration of the voice service of the digital terminal succeeds. In this way, the user can normally use the voice service. The fault of the upper-layer network includes a BRAS fault, a voice server fault, and a network fault and network congestion that are caused by other reasons.

It should be noted that the digital terminal may be an IAD, or may be a residential gateway (RG), or may further be an optical network unit (ONU), and is not limited this embodiment of the present disclosure.

According to the voice service registration method provided in this embodiment of the present disclosure, after a digital terminal re-registers a voice service for the $n^{th}$ time, the digital terminal detects that a user performs a first operation on a voice terminal connected to the digital terminal, and in this case, if detecting that registration of the voice service fails, the digital terminal directly triggers a voice service registration process. In this way, after an upper-layer network of the digital terminal is recovered from a fault, the digital terminal can directly trigger the voice service registration process according to the first operation of the user, and no longer needs to passively wait until a detection time is reached and then trigger the voice service registration process, ensuring that the voice service can be recovered in time.

Another embodiment of the present disclosure provides a voice service registration method. For ease of understanding for a person skilled in the art, the voice service registration method provided in this embodiment of the present disclosure is described in detail below according to different locations where a fault of an upper-layer network actually occurs, and details are as follows.

Figure 3:
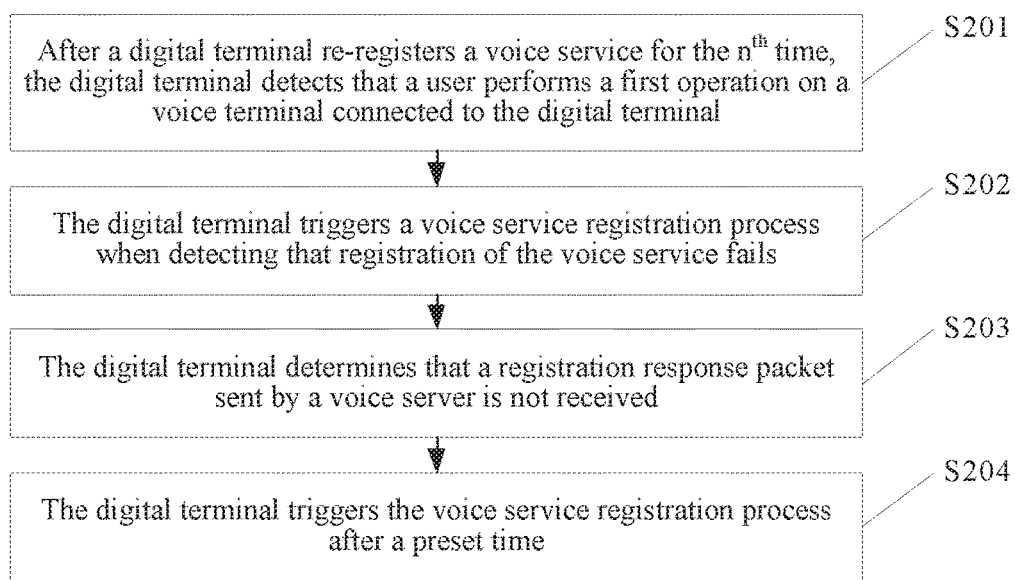
FIG. 3 is a flowchart of a voice service registration method according to another embodiment of the present disclosure.

In a case in which fault of the upper-layer network is a fault other than a BRAS fault (for example, the fault of the upper-layer network is a voice server fault, a network fault, or network congestion), the voice service registration method provided in this embodiment of the present disclosure is shown in FIG. 3, and the method may include the following steps.

Step S201: After a digital terminal re-registers a voice service for the $n^{th}$ time, the digital terminal detects that a user performs a first operation on a voice terminal connected to the digital terminal.

Step S202: The digital terminal triggers a voice service registration process when detecting that registration of the voice service fails.

After the digital terminal detects that the user performs the first operation on the voice terminal connected to the digital terminal, the digital terminal may detect whether registration of the voice service succeeds, and when the registration of the voice service fails, trigger the voice service registration process, that is, the digital terminal sends a registration packet to a voice server using an intermediate network device. In addition, after triggering the voice service registration process, the digital terminal may further play a prompt tone used to indicate that the voice service is abnormal. For example, if the first operation is an off-hook operation, when the digital terminal detects that the user performs the off-hook operation on the voice terminal connected to the digital terminal, and the digital terminal detects that registration of the voice service fails, in this case, the digital terminal may trigger the voice service registration process, and play the prompt tone used to indicate that the voice service is abnormal.

Step S203: The digital terminal determines that a registration response packet sent by a voice server is not received.

After the digital terminal triggers the voice service registration process, the digital terminal may start a timer, and determine whether the registration response packet sent by the voice server using the intermediate network device is received within a specified time (where generally, the specified time is less than one second). When the digital terminal determines that the registration response packet sent by the voice server using the intermediate network device is received within the specified time, it indicates that registration succeeds, and in this case, the digital terminal may play a prompt tone used to indicate that the voice service is normal (for example, the digital terminal plays a dial tone, and certainly, the digital terminal may also indicate, in another manner, that the voice service is normal), when the digital terminal determines that the registration response packet sent by the voice server using the intermediate network device is not received within the specified time, the digital terminal may play a prompt tone used to indicate that the voice service is abnormal (for example, the digital terminal plays a busy tone, certainly, and the digital terminal may also indicate, in another manner, that the voice service is abnormal, for example, the digital terminal may send a message to indicate that the voice service is abnormal) to prompt the user that the voice service is unavailable currently, and the digital terminal continues to perform step S204.

Step S204: The digital terminal triggers the voice service registration process after a preset time.

The preset time is less than or equal to (n+1)*T, and T is a shortest time needed by the digital terminal to trigger the voice service registration process.

For example, the preset time is equal to T. In this case, the digital terminal may trigger the voice service registration process after a time of T, and after the voice service registration process is triggered, if the digital terminal determines that the registration response packet sent by the voice server is still not received, the digital terminal triggers the voice service registration process again after a time of 2T, if the digital terminal determines that the registration response packet sent by the voice server is still not received, the digital terminal triggers the voice service registration process after a time of 3T, and so on. The digital terminal triggers the voice service registration process after a maximum time interval is reached, until registration of the voice service succeeds. That is, the digital terminal uses the voice service registration process triggered in step S202 as a first registration retry.

For example, the preset time may be equal to (n+1)*T, and in this case, the digital terminal uses the voice service registration process triggered in step S202 as an $(n+1)^{th}$ registration retry.

Preferably, before performing step S204, the digital terminal may further determine whether it is detected, within the preset time, that the user performs the first operation on the voice terminal connected to the digital terminal, and when the digital terminal does not detect, within the preset time, that the user performs the first operation on the voice terminal connected to the digital terminal, step S204 is performed. If the digital terminal detects, within the preset time, that the user performs the first operation on the voice terminal connected to the digital terminal, the digital terminal may directly trigger the voice service registration process while determining that registration of the voice service fails.

According to the voice service registration method provided in this embodiment of the present disclosure, after a digital terminal re-registers a voice service for the $n^{th}$ time, the digital terminal detects that a user performs a first operation on a voice terminal connected to the digital terminal, and in this case, if detecting that registration of the voice service fails, the digital terminal directly triggers a voice service registration process. In this way, after an upper-layer network of the digital terminal is recovered from a fault, the digital terminal can directly trigger the voice service registration process according to the first operation of the user, and no longer needs to passively wait until a detection time is reached and then trigger the voice service registration process, ensuring that the voice service can be recovered in time.

Moreover, after the digital terminal determines that a registration response packet sent by a voice server using an intermediate network device is not received, the digital terminal triggers the voice service registration process after a preset time. Compared with a method provided in other approaches, a detection time for triggering the voice service registration process is reduced such that after the upper-layer network is recovered from the fault, the voice service can be recovered in time.

Figure 4:
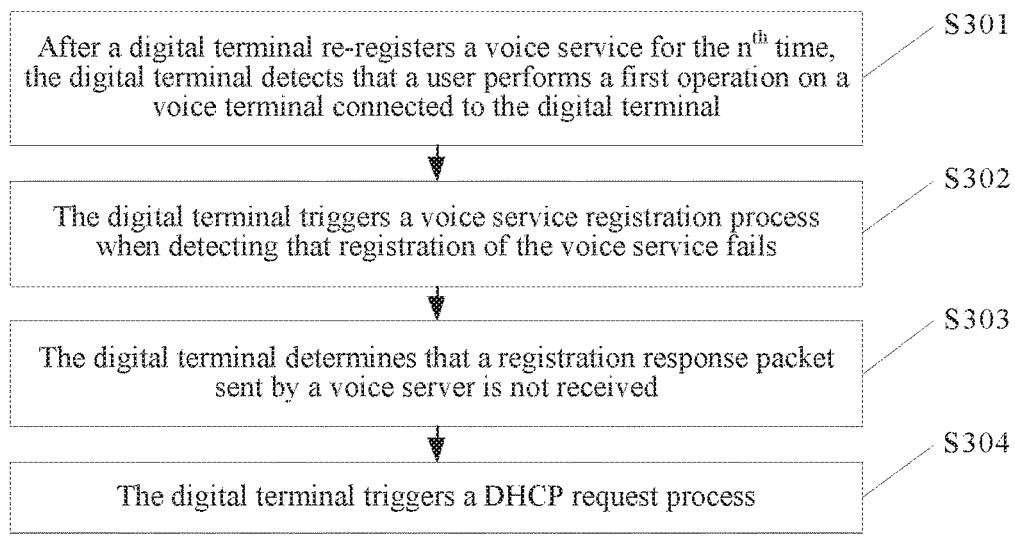
FIG. 4 is a flowchart of another voice service registration method according to another embodiment of the present disclosure.

In a case in which a fault of an upper-layer network is a BRAS fault, the voice service registration method provided in this embodiment of the present disclosure is shown in FIG. 4, and the method may include the following steps.

Step S301: After a digital terminal re-registers a voice service for the $n^{th}$ time, the digital terminal detects that a user performs a first operation on a voice terminal connected to the digital terminal.

Step S302: The digital terminal triggers a voice service registration process when detecting that registration of the voice service fails.

After the digital terminal detects that the user performs the first operation on the voice terminal connected to the digital terminal, the digital terminal may detect whether registration of the voice service succeeds, and when the registration of the voice service fails, trigger the voice service registration process, that is, the digital terminal sends a registration packet to a voice server using an intermediate network device. After triggering the voice service registration process, the digital terminal may further play a prompt tone used to indicate that the voice service is abnormal.

Step S303: The digital terminal determines that a registration response packet sent by a voice server is not received.

After the digital terminal triggers the voice service registration process, the digital terminal may start a timer, and determine whether the registration response packet sent by the voice server using the intermediate network device is received within a specified time. When the digital terminal determines that the registration response packet sent by the voice server using the intermediate network device is received within the specified time, it indicates that registration succeeds, and in this case, the digital terminal may play a prompt tone used to indicate that the voice service is normal (for example, the digital terminal plays a dial tone, and certainly, the digital terminal may indicate, in another manner, that the voice service is normal), when the digital terminal determines that the registration response packet sent by the voice server using the intermediate network device is not received within the specified time, the digital terminal may play a prompt tone used to indicate that the voice service is abnormal (for example, the digital terminal plays a busy tone, certainly, the digital terminal may also indicate, in another manner, that the voice service is abnormal, for example, the digital terminal may send a message to indicate that the voice service is abnormal) to prompt the user that the voice service is unavailable currently, and the digital terminal continues to perform step S304.

Step S304: The digital terminal triggers a DHCP request process.

Because after the BRAS is recovered from the fault, an IP address used by the digital terminal becomes an invalid IP address, and if the digital terminal still uses the invalid IP address to send, using the intermediate network device, a registration packet to the voice server, after the BRAS receives the registration packet, the BRAS discards the registration packet. Therefore, after the digital terminal determines that the registration response packet sent by the voice server is not received, the digital terminal triggers the DHCP request process, and obtains a new IP address from the BRAS to avoid a voice service registration failure caused by the invalid IP address.

Moreover, after the digital terminal obtains the new IP address, the digital terminal may immediately trigger the voice service registration process using the new IP address. In this way, a voice service registration failure caused by the invalid IP address can be avoided, and the voice service can be recovered in time. Certainly, if the fault of the upper-layer network is not the BRAS fault, after the digital terminal performs step S304, the digital terminal still obtains the original IP address, and in this case, the digital terminal may trigger the voice service registration process after waiting for the preset time. The preset time is less than or equal to $(n+1)*T$, and T is a shortest time needed by the digital terminal to trigger the voice service registration process.

According to the voice service registration method provided in this embodiment of the present disclosure, after a digital terminal re-registers a voice service for the $n^{th}$ time, the digital terminal detects that a user performs a first operation on a voice terminal connected to the digital terminal, and in this case, if detecting that registration of the voice service fails, the digital terminal directly triggers a voice service registration process. In this way, after an upper-layer network of the digital terminal is recovered from a fault, the digital terminal can directly trigger the voice service registration process according to the first operation of the user, and no longer needs to passively wait until a detection time is reached and then trigger the voice service registration process, ensuring that the voice service can be recovered in time.

Moreover, after the digital terminal determines that a registration response packet sent by a voice server using an intermediate network device is not received, the digital terminal may trigger a DHCP request process to avoid a registration failure caused by an invalid IP address such that after the upper-layer network is recovered from the fault, the voice service can be recovered in time.

Figure 5:
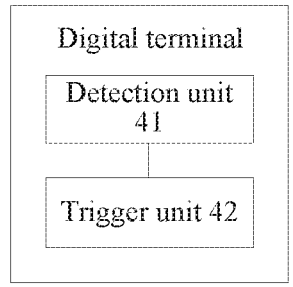
FIG. 5 is a schematic composition diagram of a digital terminal according to another embodiment of the present disclosure.

Another embodiment of the present disclosure provides a digital terminal. As shown in FIG. 5, the digital terminal may include a detection unit 41 and a trigger unit 42.

The detection unit 41 is configured to detect that a user performs a first operation on a voice terminal connected to the digital terminal after the digital terminal re-registers a voice service for the $n^{th}$ time, where n is an integer greater than or equal to 1.

The trigger unit 42 is configured to trigger a voice service registration process when it is detected that registration of the voice service fails.

Figure 6:
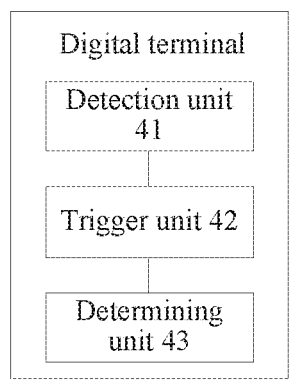
FIG. 6 is a schematic composition diagram of another digital terminal according to another embodiment of the present disclosure.

In this embodiment of the present disclosure, further, in a first possible implementation manner, when a fault of an upper-layer network of the digital terminal is a BRAS fault, as shown in FIG. 6, the digital terminal further includes a determining unit 43.

The determining unit 43 is configured to determine that a registration response packet sent by a voice server is not received after the trigger unit 42 triggers the voice service registration process when it is detected that registration of the voice service fails.

The trigger unit 42 is further configured to trigger a DHCP request process.

In this embodiment of the present disclosure, further, in a second possible implementation manner, as shown in FIG. 6, the digital terminal further includes a determining unit 43.

The determining unit 43 is configured to determine that a registration response packet sent by a voice server is not received after the trigger unit 42 triggers the voice service registration process when it is detected that registration of the voice service fails.

The trigger unit 42 is further configured to trigger the voice service registration process after a preset time.

The preset time is less than or equal to $(n+1)*T$, and T is a shortest time needed by the trigger unit 42 to trigger the voice service registration process.

In this embodiment of the present disclosure, the determining unit 43 is further configured to determine whether the first operation is detected within the preset time before the trigger unit 42 triggers the voice service registration process after the preset time.

The trigger unit 42 is further configured to trigger the voice service registration process after the preset time if the determining unit 43 does not detect the first operation within the preset time.

In this embodiment of the present disclosure, the trigger unit 42 is further configured to trigger the voice service registration process if the determining unit 43 detects the first operation within the preset time.

In this embodiment of the present disclosure, further, the first operation is any one of an off-hook operation, a key-pressing operation, an operation of starting a call application, or a touch operation.

It should be noted that for a specific operating process of each functional module in the digital terminal provided in this embodiment of the present disclosure, reference may be made to a specific description of a corresponding process in the method embodiments, and details are not described again in this embodiment of the present disclosure.

The digital terminal provided in this embodiment of the present disclosure detects, after re-registering a voice service for the $n^{th}$ time, that a user performs a first operation on a voice terminal connected to the digital terminal, and in this case, if detecting that registration of the voice service fails, the digital terminal directly triggers a voice service registration process. In this way, after an upper-layer network of the digital terminal is recovered from a fault, the digital terminal can directly trigger the voice service registration process according to the first operation of the user, and no longer needs to passively wait until a detection time is reached and then trigger the voice service registration process, ensuring that the voice service can be recovered in time.

Moreover, after the digital terminal determines that a registration response packet sent by a voice server using an intermediate network device is not received, the digital terminal triggers the voice service registration process after a preset time. Compared with a method provided in the other approaches, a detection time for triggering the voice service registration process is reduced such that after the upper-layer network is recovered from the fault, the voice service can be recovered in time. Moreover, after the digital terminal determines that a registration response packet sent by a voice server using an intermediate network device is not received, the digital terminal may trigger a DHCP request process, to avoid a voice service registration failure caused by an invalid IP address such that after the upper-layer network is recovered from the fault, the voice service can be recovered in time.

Figure 7:
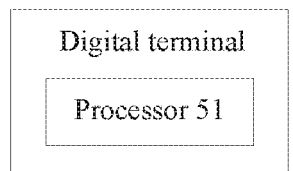
FIG. 7 is a schematic composition diagram of a digital terminal according to another embodiment of the present disclosure.

Another embodiment of the present disclosure provides a digital terminal. As shown in FIG. 7, the digital terminal may include a processor 51.

The processor 51 is configured to detect that a user performs a first operation on a voice terminal connected to the digital terminal after the digital terminal re-registers a voice service for the $n^{th}$ time, where n is an integer greater than or equal to 1.

The processor 51 is further configured to trigger a voice service registration process when detecting that registration of the voice service fails.

In this embodiment of the present disclosure, further, in a first possible implementation manner, when a fault of an upper-layer network of the digital terminal is a BRAS fault, the processor 51 is further configured to determine that a registration response packet sent by a voice server is not received after triggering the voice service registration process when detecting that registration of the voice service fails.

The processor 51 is further configured to trigger a DHCP request process.

In this embodiment of the present disclosure, in a second possible implementation manner, the processor 51 is further configured to determine that a registration response packet sent by a voice server is not received after triggering the voice service registration process when detecting that registration of the voice service fails.

The processor 51 is further configured to trigger the voice service registration process after a preset time.

The preset time is less than or equal to (n+1)*T, and T is a shortest time needed by the processor 51 to trigger the voice service registration process.

In this embodiment of the present disclosure, the processor 51 is further configured to determine whether the first operation is detected within the preset time before triggering the voice service registration process after the preset time.

The processor 51 is further configured to trigger the voice service registration process after the preset time if the first operation is not detected within the preset time.

In this embodiment of the present disclosure, the processor 51 is further configured to trigger the voice service registration process if the first operation is detected within the preset time.

In this embodiment of the present disclosure, further, the first operation is any one of an off-hook operation, a key-pressing operation, an operation of starting a call application, or a touch operation.

It should be noted that for a specific operating process of each functional module in the digital terminal provided in this embodiment of the present disclosure, reference may be made to a specific description of a corresponding process in the method embodiments, and details are not described again in this embodiment of the present disclosure.

The digital terminal provided in this embodiment of the present disclosure detects, after re-registering a voice service for the $n^{th}$ time, that a user performs a first operation on a voice terminal connected to the digital terminal, and in this case, if detecting that registration of the voice service fails, the digital terminal directly triggers a voice service registration process. In this way, after an upper-layer network of the digital terminal is recovered from a fault, the digital terminal can directly trigger the voice service registration process according to the first operation of the user, and no longer need to passively wait until a detection time is reached and then trigger the voice service registration process, ensuring that the voice service can be recovered in time.

Moreover, after the digital terminal determines that a registration response packet sent by a voice server using an intermediate network device is not received, the digital terminal triggers the voice service registration process after a preset time. Compared with a method provided in the other approaches, a detection time for triggering the voice service registration process is reduced such that after the upper-layer network is recovered from the fault, the voice service can be recovered in time. Moreover, after the digital terminal determines that a registration response packet sent by a voice server using an intermediate network device is not received, the digital terminal may trigger a DHCP request process, to avoid a voice service registration failure caused by an invalid IP address such that after the upper-layer network is recovered from the fault, the voice service can be recovered in time.

Figure 8:
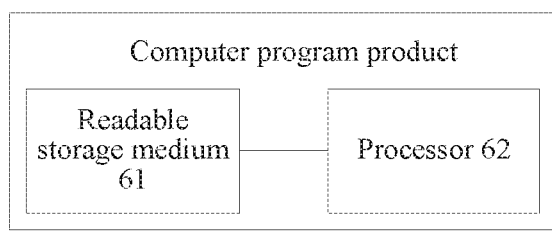
FIG. 8 is a schematic composition diagram of a computer program product according to another embodiment of the present disclosure.

Another embodiment of the present disclosure provides a computer program product. As shown in FIG. 8, the computer program product includes a readable storage medium 61 that is used to store computer program code, the computer program code is run on a processor 62, and the computer program code configured to detect that a user performs a first operation on a voice terminal connected to the computer program product after a voice service is re-registered for the $n^{th}$ time, where n is an integer greater than or equal to 1, and trigger a voice service registration process when detecting that registration of the voice service fails.

In this embodiment of the present disclosure, further, in a first possible implementation manner, when a fault of an upper-layer network of the computer program product is a BRAS fault, the computer program code further configured to determine that a registration response packet sent by a voice server is not received after triggering the voice service registration process when detecting that registration of the voice service fails, and configured to trigger a DHCP request process.

In this embodiment of the present disclosure, further, in a second possible implementation manner, the computer program code further configured to determine that a registration response packet sent by a voice server is not received after triggering the voice service registration process when detecting that registration of the voice service fails, and configured to trigger the voice service registration process after a preset time, where the preset time is less than or equal to (n+1)*T, and T is a shortest time needed to trigger the voice service registration process.

In this embodiment of the present disclosure, further, the computer program code further configured to determine whether the first operation is detected within the preset time before triggering the voice service registration process after the preset time, and trigger the voice service registration process after the preset time if the first operation is not detected within the preset time.

In this embodiment of the present disclosure, further, the computer program code further configured to trigger the voice service registration process if the first operation is detected within the preset time.

In this embodiment of the present disclosure, further, the first operation is any one of an off-hook operation, a key-pressing operation, an operation of starting a call application, or a touch operation.

According to the computer program product provided in this embodiment of the present disclosure detects, after re-registering a voice service for the $n^{th}$ time, that a user performs a first operation on a voice terminal connected to the computer program product, and in this case, if detecting that registration of the voice service fails, the computer program product directly triggers a voice service registration process. In this way, after an upper-layer network of the computer program product is recovered from a fault, the computer program product can directly trigger the voice service registration process according to the first operation of the user, and no longer needs to passively wait until a detection time is reached and then trigger the voice service registration process, ensuring that the voice service can be recovered in time.

Moreover, after the computer program product determines that a registration response packet sent by a voice server using an intermediate network device is not received, the computer program product triggers the voice service registration process after a preset time. Compared with a method provided in the other approaches, a detection time for triggering the voice service registration process is reduced such that after the upper-layer network is recovered from the fault, the voice service can be recovered in time. Moreover, after the computer program product determines that a registration response packet sent by a voice server using an intermediate network device is not received, the computer program product may trigger a DHCP request process, to avoid a voice service registration failure caused by an invalid IP address such that after the upper-layer network is recovered from the fault, the voice service can be recovered in time.

The foregoing descriptions about implementation manners allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present disclosure essentially, or the part contributing to the other approaches, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A voice service registration method, comprising:
    detecting, by a digital terminal, that a user performs a first operation on a voice terminal connected to the digital terminal after the digital terminal re-registers a voice service for an $n^{th}$ time, wherein n is an integer greater than or equal to one, and wherein the first operation comprises an off-hook operation; and
    triggering, by the digital terminal, a voice service registration process when detecting that registration of the voice service fails.

2. The voice service registration method of claim 1, wherein when a fault of an upper-layer network of the digital terminal is a broadband remote access server (BRAS) fault, after triggering the voice service registration process, the voice service registration method further comprises:
    determining, by the digital terminal, that a registration response packet from a voice server is not received; and
    triggering, by the digital terminal, a Dynamic Host Configuration Protocol (DHCP) request process.

3. The voice service registration method of claim 1, wherein after triggering the voice service registration process, the voice service registration method further comprises:
    determining, by the digital terminal, that a registration response packet from a voice server is not received; and
    triggering, by the digital terminal, the voice service registration process after a preset time,
    wherein the preset time is less than or equal to $(n+1)*T$, and
    wherein T is a shortest time needed by the digital terminal to trigger the voice service registration process.

4. The voice service registration method of claim 3, wherein before triggering the voice service registration process after the preset time, the voice service registration method further comprises determining, by the digital terminal, whether the first operation is detected within the preset time, and wherein triggering the voice service registration process after the preset time comprises triggering, by the digital terminal, the voice service registration process after the preset time and when the digital terminal does not detect the first operation within the preset time.

5. The voice service registration method of claim 4, further comprising triggering the voice service registration process when the digital terminal detects the first operation within the preset time.

6. The voice service registration method of claim 1, wherein the first operation further comprises a key-pressing operation.

7. The voice service registration method of claim 1, wherein the first operation further comprises an operation of starting a call application.

8. The voice service registration method of claim 1, wherein the first operation further comprises a touch operation.

9. A voice service registration method, comprising:
- detecting, by a digital terminal, that a user performs a first operation on a voice terminal connected to the digital terminal after the digital terminal re-registers a voice service for an $n^{th}$ time, wherein n is an integer greater than or equal to one;
- triggering, by the digital terminal, a voice service registration process when detecting that registration of the voice service fails, wherein a fault of an upper-layer network of the digital terminal is a broadband remote access server (BRAS) fault;
- determining, by the digital terminal, that a registration response packet from a voice server is not received; and
- triggering, by the digital terminal, a Dynamic Host Configuration Protocol (DHCP) request process.

10. The voice service registration method of claim 9, wherein the first operation comprises an off-hook operation, a key pressing operation, an operation of starting a call application, or a touch operation.

11. A digital terminal, comprising:
- a memory comprising a computer program; and
- a processor coupled to the memory, wherein the computer program causes the processor to be configured to:
  - detect that a user performs a first operation on a voice terminal connected to the digital terminal after the digital terminal re-registers a voice service for an $n^{th}$ time, wherein n is an integer greater than or equal to one, and wherein the first operation comprises an off-hook operation; and
  - trigger a voice service registration process when detecting that registration of the voice service fails.

12. The digital terminal of claim 11, wherein the first operation further comprises a key-pressing operation.

13. The digital terminal of claim 11, wherein the first operation further comprises a touch operation.

14. The digital terminal of claim 11, wherein when a fault of an upper-layer network of the digital terminal is a broadband remote access server (BRAS) fault, the computer program further causes the processor to be configured to:
- determine that a registration response packet from a voice server is not received after triggering the voice service registration process when detecting that registration of the voice service fails; and
- trigger a Dynamic Host Configuration Protocol (DHCP) request process.

15. The digital terminal of claim 11, wherein the computer program further causes the processor to be configured to:
- determine that a registration response packet from a voice server is not received after triggering the voice service registration process when detecting that registration of the voice service fails; and
- trigger the voice service registration process after a preset time,
- wherein the preset time is less than or equal to $(n+1)*T$, and
- wherein T is a shortest time needed by the processor to trigger the voice service registration process.

16. The digital terminal of claim 15, wherein the computer program further causes the processor to be configured to:
- determine whether the first operation is detected within the preset time before triggering the voice service registration process after the preset time; and
- trigger the voice service registration process after the preset time when the first operation is not detected within the preset time.

17. The digital terminal of claim 16, wherein the computer program further causes the processor to be configured to trigger the voice service registration process when the first operation is detected within the preset time.

18. The digital terminal of claim 11, wherein the first operation further comprises an operation of starting a call application.

* * * * *